July 13, 1937.   G. P. AMES   2,086,658
CAN OPENING AND MIXING MACHINE
Original Filed Feb. 13, 1935   3 Sheets-Sheet 1

INVENTOR,
George P. Ames,
BY
Harry W. Bowen,
ATTORNEY.

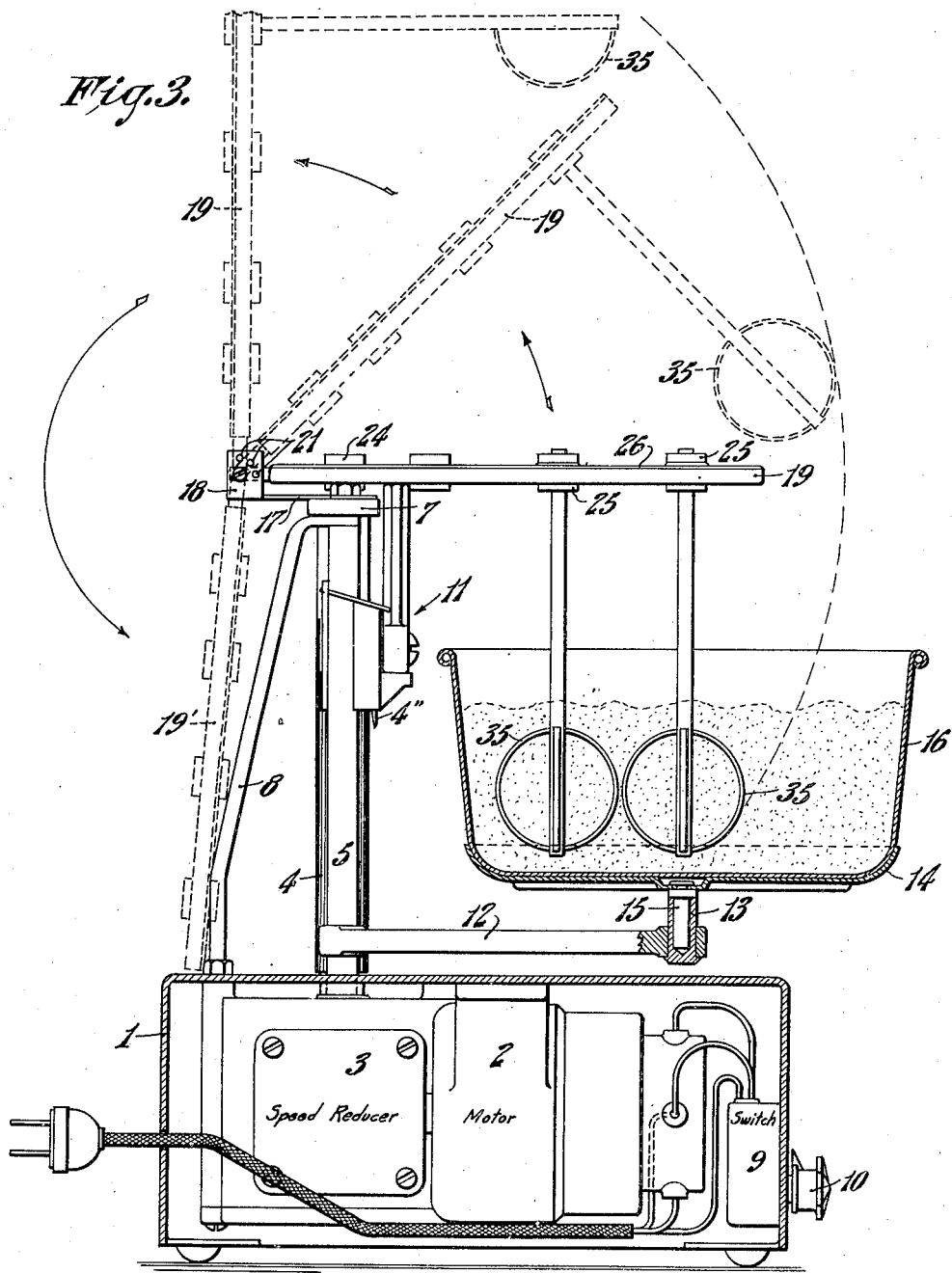

July 13, 1937.
G. P. AMES
2,086,658
CAN OPENING AND MIXING MACHINE
Original Filed Feb. 13, 1935     3 Sheets—Sheet 3
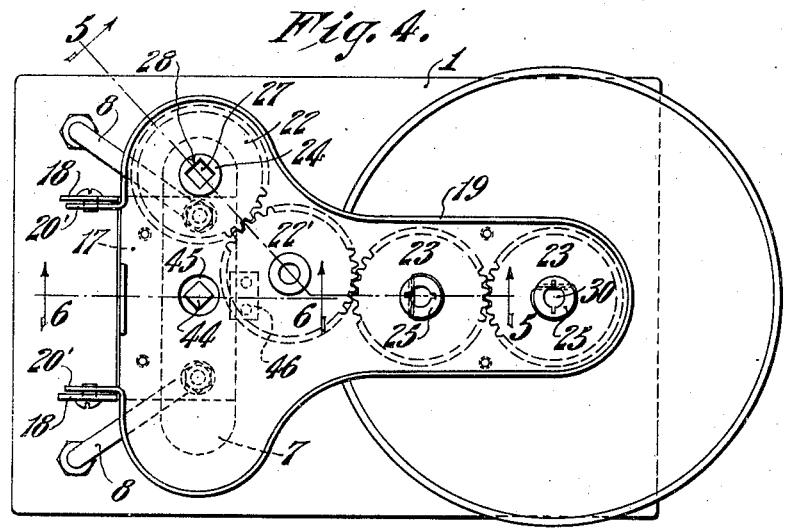
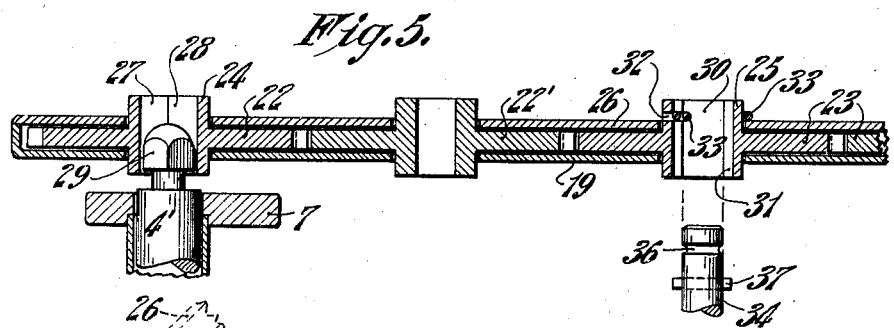
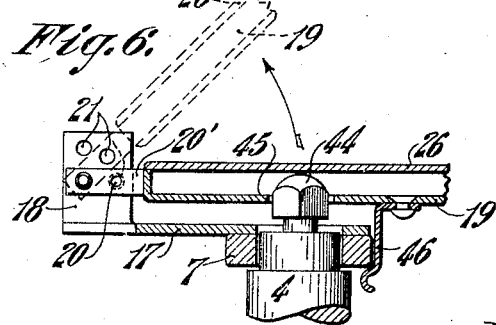
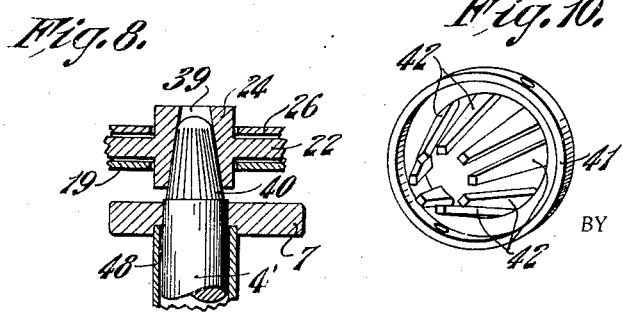
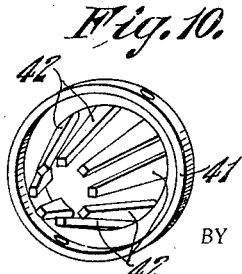
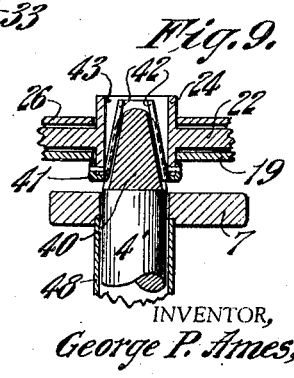
INVENTOR,
George P. Ames,
BY
Harry W. Bowen
ATTORNEY.

Patented July 13, 1937

2,086,658

UNITED STATES PATENT OFFICE 2,086,658

CAN OPENING AND MIXING MACHINE

George P. Ames, Springfield, Mass.

Application February 13, 1935, Serial No. 6,282
Renewed December 15, 1936

6 Claims. (Cl. 259—84)

My invention relates to improvements in can opening and mixing machines, and is particularly, an improvement in the can opening machines disclosed in my Patent #1,845,213, issued to me on February 16, 1932, and an application filed by me on October 5, 1934, and bearing Serial Number 747,026.

An object of my invention is to provide, in a single mechanically operated unit, means for cutting open a can and means for performing the usual mixing operations incidental to the preparation of food and food products.

A second object of my invention is to provide, in a combined can opening and mixing machine, means for adjustably supporting a receptacle for a substance to be mixed, or agitated, as a batter for cake and the like, within the field of operations during mixing, and outside of the field of operations, when the can-opening mechanism is in action.

A third, or further, object of my invention is to provide, in a combined can opening and mixing machine, a motor, operating means for the can opening mechanism driven from the motor, driving means for the mixing tools, operative connecting means between the mixing drive and the motor, so arranged that the mixing drive may be quickly and easily disconnected from the motor.

These, and other objects and advantages of my invention, will be more completely disclosed and described in the accompanying specification and drawings, and the appended claims.

Broadly, my invention comprises a base member upon which a can to be opened may be supported, a can drive shaft against which the can is held for imparting rotary motion thereto during the operation of cutting open a can; a motor, operative connecting means between the motor and the can drive shaft, guide posts on either side of the drive shaft, a can opening mechanism slidably supported on the guide posts, a receptacle for substances to be mixed, means for supporting the said receptacle slidably and rotatably secured on one of the guide posts, a casing pivotally secured on the guide posts, mixing tool holders rotatably supported in the casing, a second drive shaft connected to the motor, and operative connecting means between the mixing tool holders and the second drive shaft, whereby, with the casing in operative position, the mixing tool holders will be operated by the second drive shaft, and, when the casing is swung out of operative position around its pivotal support, the operative connecting means between the tool holders and the second drive shaft will be disconnected.

A preferred embodiment of my invention is illustrated in the accompanying drawings, in which:—

Fig. 3 is a side, elevational view, partially in section, showing the mixing receptacle in place.

Fig. 4 is a plan view of the mixing tool-casing with cover removed.

Fig. 5 is a detail, sectional view on the line 5—5 of Fig. 4.

Fig. 6 is a detail, sectional view on the line 6—6 of Fig. 4.

Fig. 7 is a detail, sectional view of one of the mixing tool holders.

Figs. 8 and 9 are views similar to Fig. 5, illustrating a modified form of connecting means between the drive shaft and the mixing tool gears, and Fig. 10 is a perspective view of the insert shown in Fig. 9.

Referring now to the drawings in detail, in which like numerals refer to like parts throughout:—

Figure 1:
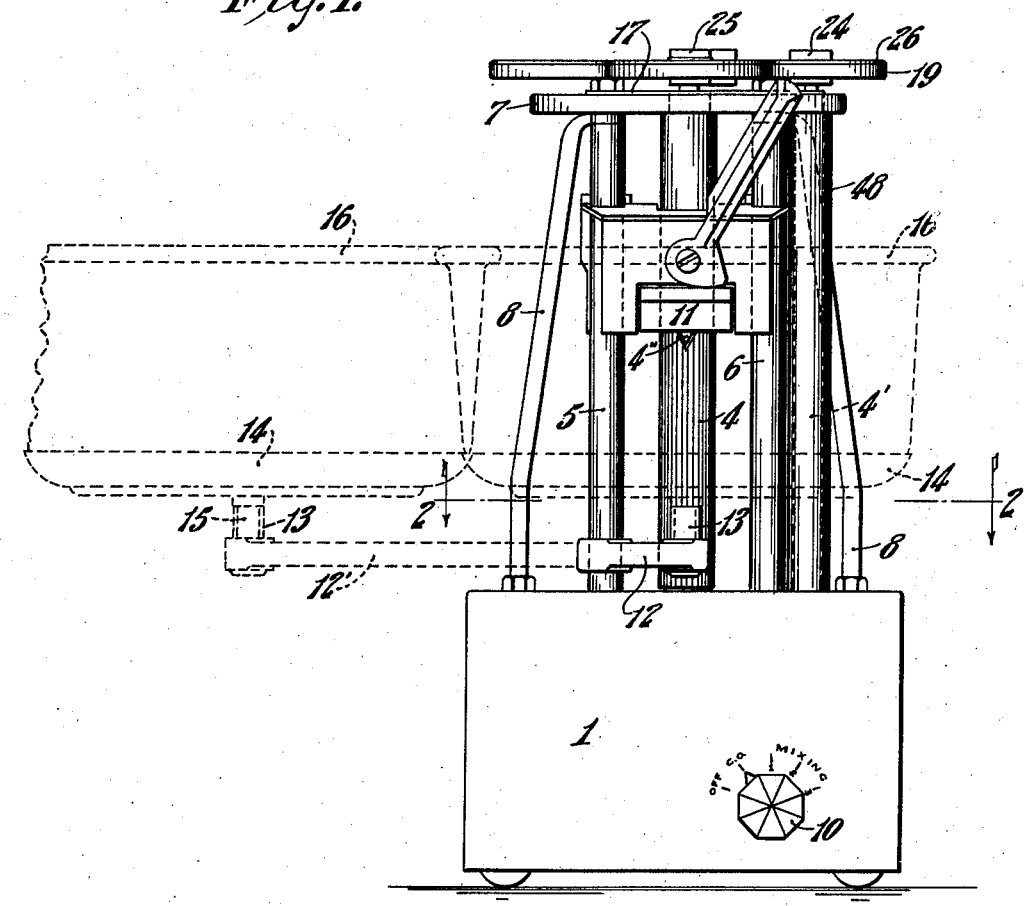
Fig. 1 is a front, elevational view of the combined can opening and mixing machine.

A base member casing 1 has secured therein a motor 2, (see Fig. 3,) which is operatively connected by means of a speed reducing unit 3 to two vertical drive shafts 4 and 4'. Vertical guide rods 5 and 6, secured on the base member casing 1, support a bearing plate 7 in which the shafts 4 and 4' are revolvably guided. The bearing plate 7 is further supported by brace rods 8, secured on the top of the guide rods 5 and 6 and to the base member 1. The motor 2 is wound for different speeds, and is controlled by a switch 9, operated by an indicating button 10. A can opening mechanism 11 is slidably secured on the guide rods 5 and 6. The mechanism 11 forms no part of this invention, except in combination with the other elements herein described, and its construction and operation are described in detail in my Patent #1,845,213, to which I refer for such description.

A bracket, or arm member 12, is rotatably and slidably secured on the guide rod 5, and is provided at its outer extremity with a tubular bearing stud 13.

A receptacle supporting member 14, provided with a dowwardly extending stud 15, may be removably and revolvably supported on the arm 12, by inserting the stud 15 in the tubular stud 13.

A receptacle 16, containing a substance to be mixed or whipped, may be placed on the member 14, or removed therefrom, at will.

A plate 17, secured on the bearing plate 7 and formed with upwardly extending bearing portions 18, has pivotally secured in the bearing portions 18, a casing member 19. Projections 20, on ears 20' of the casing 19, engage in recesses, or detents 21 in the bearing portions 18 of the plate 17 to hold the casing 19 in operative, or horizontal position, as indicated by the full lines in Fig. 3, or in inoperative position, either at 45 degrees, or vertically, as indicated by dotted lines in Fig. 3. When not in use, the casing 19 may be swung downwardly in back of the shafts 4 and 4' and rods 5 and 6, as indicated at 19' in Fig. 3.

Gears 22, 22' and 23, provided with hubs 24 and 25, respectively, are revolvably secured within the casing 19 by a cover plate 26, and the gears 22 and 23 are operatively engaged, so that when one revolves, all revolve. The hub portion 24 of the gear 22 is formed with an opening 27 having one, or more, flat sides 28, and a projecting portion 29 on the drive shaft 4', shaped to match the opening 27, is engaged in the opening 27, when the casing 19 is in operative position, to revolve the gear 22, and, by means of the gear 22, the gears 22' and 23. When the casing 19 is raised, as shown by dotted lines in Figs. 3 and 6, the portion 29 of the drive shaft 4, will be disengaged from the hub 24, thus disconnecting the gears 22 and 23 from the drive shaft 4'.

Each of the hubs 25 of the gears 23 are formed with an opening 30 and a keyway 31. The hubs 25 are also recessed at 32, and a spring 33, located in the recess 32, provides locking means for holding a shank 34 of a mixing tool, or implement 35, in the hub 25. The shank 34 is formed with a groove 36 which is engaged by the spring 33, when the shank 34 is in the hub 25, to hold the mixing implement in the hub 25, and the shank 34 is also provided with a pin 37 which engages the keyway 31 for revolving the member 35 with the gear 23.

A modified form of connecting means between the drive shaft 4' and the hub 24 is illustrated in Fig. 8. The hub 24 of the gear 22 is formed with a tapered opening 39 which is engaged, when the casing 19 is in operative position, by a conical projecting portion 40 on the drive shaft 4'. The portion 40 may be fluted, or toothed, if desired, to provide a driving engagement in the hub 24.

A further modification of the connecting means between the drive shaft 4' and the hub 24 is illustrated in Figs. 9 and 10. An insert 41 is secured on the hub 24, and is formed with inwardly tapering tongues 42, which are positioned within an opening 43 in the hub 24. The member 41 is made preferably of spring steel, and when the casing 19 is lowered into position over the shaft 4', the tongues 42 will spread if registering with the outer surface of the teeth, or flutes on the portion 40 of the shaft 4'. A slight movement of the shaft 4' will cause the teeth, or flutes, to move out of register with the tongues 42, and the tongues 42 will snap into position between the teeth of the portion 40, thus providing a positive drive for the gear 22.

The fluted shaft 4 is formed with a projecting portion 44, similar to the portion 29 or 40, on the shaft 4', which normally projects through an opening 45 in the casing 19, (see Fig. 6). When the casing 19 is positioned, as shown at 19' in Fig. 3, a meat grinder, or similar device, may be placed on the plate 7 and operated from the shaft 4. A spring clip 46, secured on the under side of the casing 19, engages the plate 7 to hold the casing 19 in operative position and prevent the same from being raised out of operative position by resistance of any substance in the receptacle 16 acting on the tools or implements 35.

A sleeve, or tube 48, supported between the base 1 and the plate 7, serves as a guard for the shaft 4'.

Figure 2:
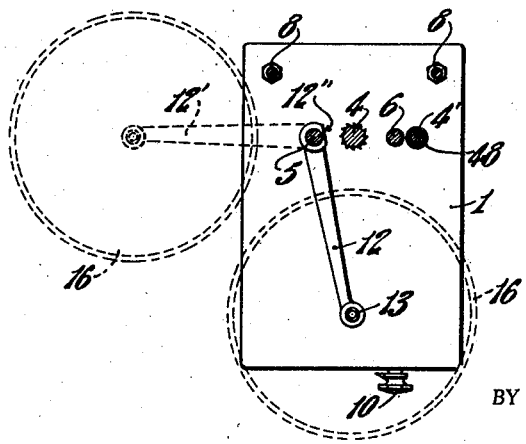
Fig. 2 is a plan, sectional view on the line 2—2 of Fig. 1.

In operation, when the can opening mechanism is to be used, arm 12 with the receptacle holder 14 and receptacle 16, may be swung out of the way, into the position indicated by dotted lines at 12' in Figs. 1 and 2. The casing 19 may be swung upward and downward into the dotted position 19', indicated in Fig. 3. A can is then placed on the base 1, against the fluted shaft 4, the can opening mechanism 11 lowered, until the knife 4'' penetrates the top of the can and forces the side of the can against the fluted shaft 4, the motor started, and the can revolved by engagement with the shaft 4, until the cover is cut out of the can, as fully explained in the above-mentioned patent. When the mixing mechanism is to be used, the can-operating mechanism 11 is raised to a position, as shown in Fig. 1, the arm 12 swung into position approximately in the center of the base 1, and the gear-containing casing 19 swung over into the operative position, shown in full lines in Fig. 3. A receptacle 16, containing the substances to be mixed, is placed on the holder 14, and the proper mixing implement secured in one of the hubs 25. Operation of the motor will then revolve the mixing tools, or implement 35. The pivotal mounting 15 of the holder 14 will permit revolution of the holder 14 and receptacle 16 during mixing operations, thereby reducing the drag on the motor 2. When it is desired to remove the receptacle 16 from the holder 14, the casing 19 may be raised, either 45 degrees or 90 degrees, as indicated in Fig. 3, thus completely clearing the tool, or implement 35, from the receptacle 16. In either of these positions, it will be noted that any drip, from the implement 35, will fall into the holder 14. One, or more, mixing implements may be used, as indicated in Fig. 3, or, if desired, the arm 12 and holder 14 may be swung out of the way and a glass, mixing container, or other article, may be placed directly on the base 1, co-operating with a mixing implement in any of the hubs 25. The arm 12 is cut away at 12'' to provide clearance for a can engaged against the shaft 4.

What I claim is:—

1. In combination, in a mixing machine, a base member, a motor therein, a gear containing casing member pivotally connected to the base member, gears therein operatively connected to the motor for operating the gears, means for disconnecting the motor from the gears in the casing member when the casing is elevated about its pivotal connection, a mixing receptacle below the casing, an operating tool therein, and detachable means for connecting and disconnecting said tool from one of said gears.

2. In combination, in a mixing machine, a base member, a motor therein, a gear casing member pivotally connected to the base member, gears therein operatively connected to the motor for operating the gears, means for disconnecting the motor from the gears in the casing member when elevated, a mixing receptacle, an operating tool therein, and detachable means for connecting and disconnecting said tool from one of said gears, said motor disconnecting means comprising a pivotal connection of the gear casing to the base member, and interengaging means between a gear and a motor-operated shaft.

3. In a combined can opening and mixing machine, a base casing member, a motor therein, a fluted shaft member connected to the motor, a plate, a second shaft, the plate having openings to provide bearings for the fluted member and said second shaft, means for supporting the plate on the base casing, a gear casing, gears therein, the casing being pivotally connected to the plate and the gears therein operatively connected to the second shaft, the gear casing having an enlarged opening to receive a projection on the fluted member to permit the fluted shaft to operate when the gears are operated, a mixing receptacle, a tool therein, and connecting means between the said tool and the gears.

4. In a combined can opening and mixing machine, a base casing member, a motor therein, a fluted shaft member connected to the motor, a plate, a second shaft, the plate having openings to provide bearings for the fluted shaft member and said second shaft, means for supporting the plate on the base casing, a gear casing, gears therein, the gear casing being pivotally connected to the plate and the gears therein operatively connected to the second shaft, the gear casing having an enlarged opening to receive a projection on the fluted member to permit the fluted shaft to operate when the gears are operated, a mixing receptacle, a tool therein, connecting means between the said tool and the gears, and means for retaining the gear casing in different positions of adjustment when disconnected from the second operating shaft.

5. In combination, in a mixing machine, a base member, a motor therein, a gear casing member pivotally connected to the base member, gears therein operatively connected to the motor for operating the gears, means for disconnecting the motor from the gears in the casing member when elevated, a mixing receptacle, an operating tool therein, and detachable means for connecting and disconnecting said tool from one of said gears, said motor disconnecting means comprising a pivotal connection of the gear casing to the base member, and interengaging means between a gear and a motor operated-shaft, and means for permitting movement of the mixing receptacle away from the operating tool of the receptacle when the casing and tool are elevated to disconnect the motor from the gears in the casing.

6. In a combined can opening and mixing machine, a base casing member, a motor therein, a fluted shaft member connected to the motor, a plate, a second shaft, the plate having openings to provide bearings for the fluted shaft member and said second shaft, means for supporting the plate on the base casing, a gear casing, gears therein, the gear casing being pivotally connected to the plate and the gears therein operatively connected to the second shaft, the gear casing having an enlarged opening to receive a projection on the fluted member to permit the fluted shaft to operate when the gears are operated, a mixing receptacle, a tool therein, connecting means between the said tool and the gears, means for retaining the gear casing in different positions of adjustment when disconnected from the second operating shaft, and means for moving the mixing receptacle towards and away from the mixing tool of the receptacle.

GEORGE P. AMES.